US009473816B2

(12) United States Patent
Prakash et al.

(10) Patent No.: US 9,473,816 B2
(45) Date of Patent: Oct. 18, 2016

(54) MEDIA CONTENT RATING MANAGEMENT WITH PATTERN MATCHING

(75) Inventors: Gyan Prakash, Beaverton, OR (US); James F. Bodio, Tigard, OR (US); Selim Aissi, Menlo Park, OR (US)

(73) Assignee: INTEL CORPORATION, Santa Clara, CA (US)

(*) Notice: Subject to any disclaimer, the term of this patent is extended or adjusted under 35 U.S.C. 154(b) by 362 days.

(21) Appl. No.: 13/991,439

(22) PCT Filed: Sep. 30, 2011

(86) PCT No.: PCT/US2011/054400
§ 371 (c)(1),
(2), (4) Date: Jun. 24, 2014

(87) PCT Pub. No.: WO2013/048481
PCT Pub. Date: Apr. 4, 2013

(65) Prior Publication Data
US 2015/0100535 A1     Apr. 9, 2015

(51) Int. Cl.
| G06F 17/00 | (2006.01) |
| G06N 5/02 | (2006.01) |
| H04N 21/454 | (2011.01) |
| H04N 21/439 | (2011.01) |
| H04N 21/44 | (2011.01) |

(Continued)

(52) U.S. Cl.
CPC ............ H04N 21/454 (2013.01); G06N 5/02 (2013.01); H04N 21/266 (2013.01); H04N 21/4394 (2013.01); H04N 21/44008 (2013.01); H04N 21/4542 (2013.01); H04N 21/45457 (2013.01); H04N 21/4756 (2013.01); H04N 21/25875 (2013.01); H04N 21/441 (2013.01)

(58) Field of Classification Search
USPC .......................................................... 706/48
See application file for complete search history.

(56) References Cited

U.S. PATENT DOCUMENTS

| 7,549,058 B1 | 6/2009 | Wang et al. |
| 7,861,257 B2 | 12/2010 | Park et al. |

(Continued)

FOREIGN PATENT DOCUMENTS

| CN | 1909599 A | 2/2007 |
| CN | 101193234 A | 6/2008 |

(Continued)

OTHER PUBLICATIONS

Determining shot assonance/dissonance via salience maps and the match frame principle of continuity editing R. Turetsky; X. Halkias 2006 12th International Multi-Media Modelling Conference Year: 2006 p. 7 pp., DOI: 10.1109/MMMC.2006.1651298 IEEE Conference Publications.*

(Continued)

*Primary Examiner* — Michael B Holmes
(74) *Attorney, Agent, or Firm* — Grossman, Tucker, Perrault & Pfleger, PLLC

(57) ABSTRACT

A method according to one embodiment includes the operations of determining a requested playback media content rating; selecting a pattern matching database associated with the requested playback media content rating; scanning one or more frames of media content; and comparing the scanned frames of media content to the pattern matching database to determine matched frames for omission from playback based on the requested playback media content rating.

27 Claims, 4 Drawing Sheets

(51) Int. Cl.
*H04N 21/4545* (2011.01)
*H04N 21/475* (2011.01)
*H04N 21/266* (2011.01)
*H04N 21/258* (2011.01)
*H04N 21/441* (2011.01)

(56) References Cited

U.S. PATENT DOCUMENTS

| | | | | |
|---|---|---|---|---|
| 8,560,453 | B2* | 10/2013 | Pendakur | G06Q 30/0241 705/14.4 |
| 8,768,842 | B2* | 7/2014 | Aissi | G06F 21/60 700/222 |
| 8,782,398 | B2* | 7/2014 | Mirashrafi | H04L 63/0823 713/155 |
| 8,795,388 | B2* | 8/2014 | Aissi | G06F 21/6209 726/35 |
| 8,798,610 | B2* | 8/2014 | Prakash | H04L 63/20 455/411 |
| 8,806,620 | B2* | 8/2014 | Purcell | G06F 21/554 726/22 |
| 8,850,220 | B2* | 9/2014 | Prakash | G06F 21/575 713/164 |
| 8,874,898 | B2* | 10/2014 | Dadu | H04B 3/542 713/153 |
| 8,892,904 | B2* | 11/2014 | Mirashrafi | G06F 21/31 713/164 |
| 8,955,039 | B2* | 2/2015 | Prakash | G06F 21/6218 713/168 |
| 8,996,879 | B2* | 3/2015 | Poornachandran | H04L 63/0853 713/185 |
| 9,026,820 | B2* | 5/2015 | Bodio | G06F 1/3203 713/320 |
| 9,031,226 | B2* | 5/2015 | Chukka | H04L 65/60 379/428.01 |
| 2007/0053325 | A1 | 3/2007 | Shin et al. | |
| 2007/0055981 | A1 | 3/2007 | Lee | |
| 2007/0282747 | A1 | 12/2007 | Shen et al. | |
| 2008/0127242 | A1 | 5/2008 | Katayama | |
| 2009/0204404 | A1 | 8/2009 | Jarman et al. | |
| 2010/0174722 | A1 | 7/2010 | Carteri | |
| 2011/0065419 | A1 | 3/2011 | Book et al. | |

FOREIGN PATENT DOCUMENTS

| | | |
|---|---|---|
| JP | 08180418 A | 7/1996 |
| JP | 2000013703 A | 1/2000 |
| JP | 2000-152208 A | 5/2000 |
| JP | 2004526373 A | 8/2004 |
| JP | 2005-354497 A | 12/2005 |
| KR | 10-2005-0119319 A | 12/2005 |
| KR | 10-2009-0083521 A | 8/2009 |
| WO | 02/080530 | 10/2002 |
| WO | 2013/048481 A1 | 4/2013 |

OTHER PUBLICATIONS

LMI-based 2D-3D registration: From uncalibrated images to Euclidean scene Danda Pani Paudel; Adlane Habed; Cédric Demonceaux; Pascal Vasseur 2015 IEEE Conference on Computer Vision and Pattern Recognition (CVPR) Year: 2015 pp. 4494-4502, DOI: 10.1109/CVPR.2015.7299079 IEEE Conference Publications.*
Streaming media caching algorithms for transcoding proxies Xueyan Tang; Fan Zhang; S. T. Chanson Parallel Processing, 2002. Proceedings. International Conference on Year: 2002 pp. 287-295, DOI: 10.1109/ICPP.2002.1040884 IEEE Conference Publications.*
Locality-constrained Linear Coding for image classification Jinjun Wang; Jianchao Yang; Kai Yu; Fengjun Lv; Thomas Huang; Yihong Gong Computer Vision and Pattern Recognition (CVPR), 2010 IEEE Conference on Year: 2010 pp. 3360-3367, DOI: 10.1109/CVPR.2010.5540018 IEEE Conference Publication.*
Taiwan Office Action from related application TW101132716 mailed Nov. 9, 2015.
Korean Office Action from related case KR10-2014-7008163 mailed Mar. 31, 2015.
Korean Office Action from related case KR10-2014-7008163 mailed Dec. 15, 2015.
Japan Office Action from related case JP2014533276 dated Feb. 9, 2016.
European Search Report received for PCT Application No. PCT/US2011/054400, mailed on Feb. 5, 2015, 7 pages.
International Search Report and Written Opinion received for PCT application No. PCT/US2011/054400, mailed on May 29, 2012, 9 Pages.
International Preliminary Report on Patentability and Written Opinion received for PCT application No. PCT/US2011/054400, mailed on Apr. 1, 2014.
Office Action received for Japanese Patent Application No. 2014-533276, mailed on Jun. 2, 2015, 2 pages English translation and 1 page Japanese Office Action.
Chinese Office Action dated Jul. 11, 2016 issued in Chinese Application No. 201180073824, with English translation.
Korean Office Action dated Jun. 20, 2016 issued in Korean Application No. 10-2014-7008163, with English translation.

* cited by examiner

MEDIA CONTENT RATING MANAGEMENT WITH PATTERN MATCHING

CROSS-REFERENCE TO RELATED APPLICATIONS

This application is a U.S. national stage completion of International Application No. PCT/US2011/054400 filed Sep. 30, 2011, the entire content of which is herein incorporated by reference.

FIELD

The present disclosure relates to media content rating management, and more particularly, to media content rating management with pattern matching.

BACKGROUND

Rating systems for media content are available to provide guidance, for example, to parents that wish to restrict access of such media to their children. The Motion Picture Association of America (MPAA) provides film ratings and the Entertainment Software Rating Board (ERSB) provides ratings for television, games and other media content. Ratings generally provide an indication of the level of violence, profanity and/or sexually explicit material in the media content although they can be used to indicate content associated with any category of interest.

These ratings are static, however, so one either chooses to view or block the media content, depending on the rating. Additionally, ratings are not generally available for online media content such as, for example, YouTube.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for media content rating management with pattern matching. These techniques provide both real-time and offline filtering of media content frames based on a media content rating. The media content rating may be requested by a user or be associated with a platform. A pattern matching database, associated with the media content rating, provides patterns for matching to frames of the media content. Matched frames may be omitted during playback of the media content so that the playback conforms to the media content rating. One example of media content ratings is the rating system used by the MPAA for films which includes G for general audiences, PG for parental guidance, PG-13 for inappropriate for children under 13, R for restricted, etc. Other rating systems exist or can be created as needed for a given situation.

Figure 1:
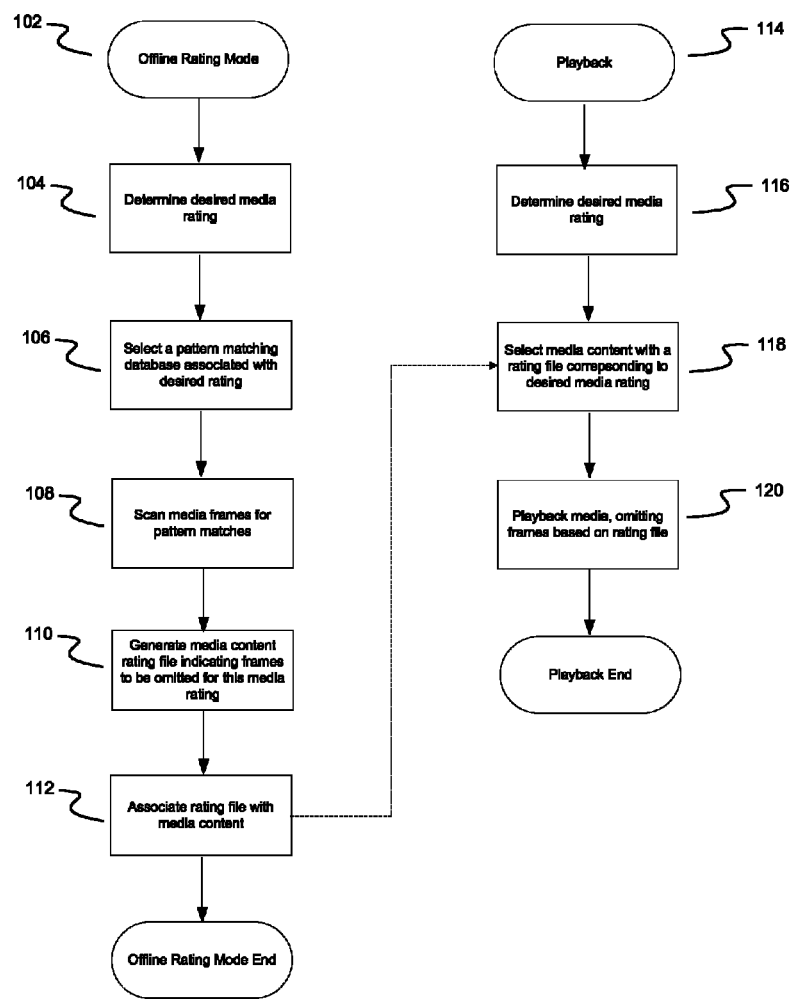
FIG. 1 illustrates a flowchart of operations of one exemplary embodiment consistent with the present disclosure.

FIG. 1 illustrates a flowchart 100 of operations of one exemplary embodiment consistent with the present disclosure. An offline rating mode 102 and a playback operation 114, for later playback, are illustrated. At operation 104, a desired media rating is determined. This represents the media rating at which the processed media content will eventually be presented during the playback operation 114. At operation 106, a pattern matching database, which is associated with the media rating, is selected. The media content is then scanned, at operation 108, such that each frame is matched against patterns in the pattern database to determine whether that frame should be included or omitted during the subsequent playback. The pattern matching may be based on any combination of audio, video, subtitle or other suitable information. Pattern matching techniques may include existing known techniques, and/or other after-developed techniques.

At operation 110, a media content rating file is generated. This file indicates which frames may be omitted during playback of the media content in order to conform to the desired media rating. At operation 112, the rating file is linked to or otherwise associated with the media content. The offline rating mode process may end at this point or it may be repeated for other desired media ratings. In this manner a library of media content rating files may be generated and associated with the media content, one for each possible media rating. The process of generating a media content rating file, or library of such files, may be performed by the producer of the media, the distributor of the media, the end-user of the media or any other suitable entity involved with the media.

At operation 114, a playback operation is illustrated. The playback operation may occur at any time subsequent to the offline rating mode operation 102. At operation 116, a desired media rating for the playback is determined. The desired media rating may be determined from user input or from a platform configuration as will be explained in greater detail below. At operation 118, media content is selected for playback along with an associated media content rating file corresponding to the desired media rating that was generated during an earlier offline rating mode operation 102. At operation 120, playback of the media content is performed with frames omitted from or filtered out of the playback as indicated by the media content rating file. When frames are omitted during playback, the audio associated with those frames may also be omitted.

In some embodiments the desired media rating may be changed during playback, i.e., on-the-fly, based on user input. When this occurs, a new media content rating file associated with the new media rating is selected and substituted for use in determining frame omission going forward in the media playback process.

Figure 2:
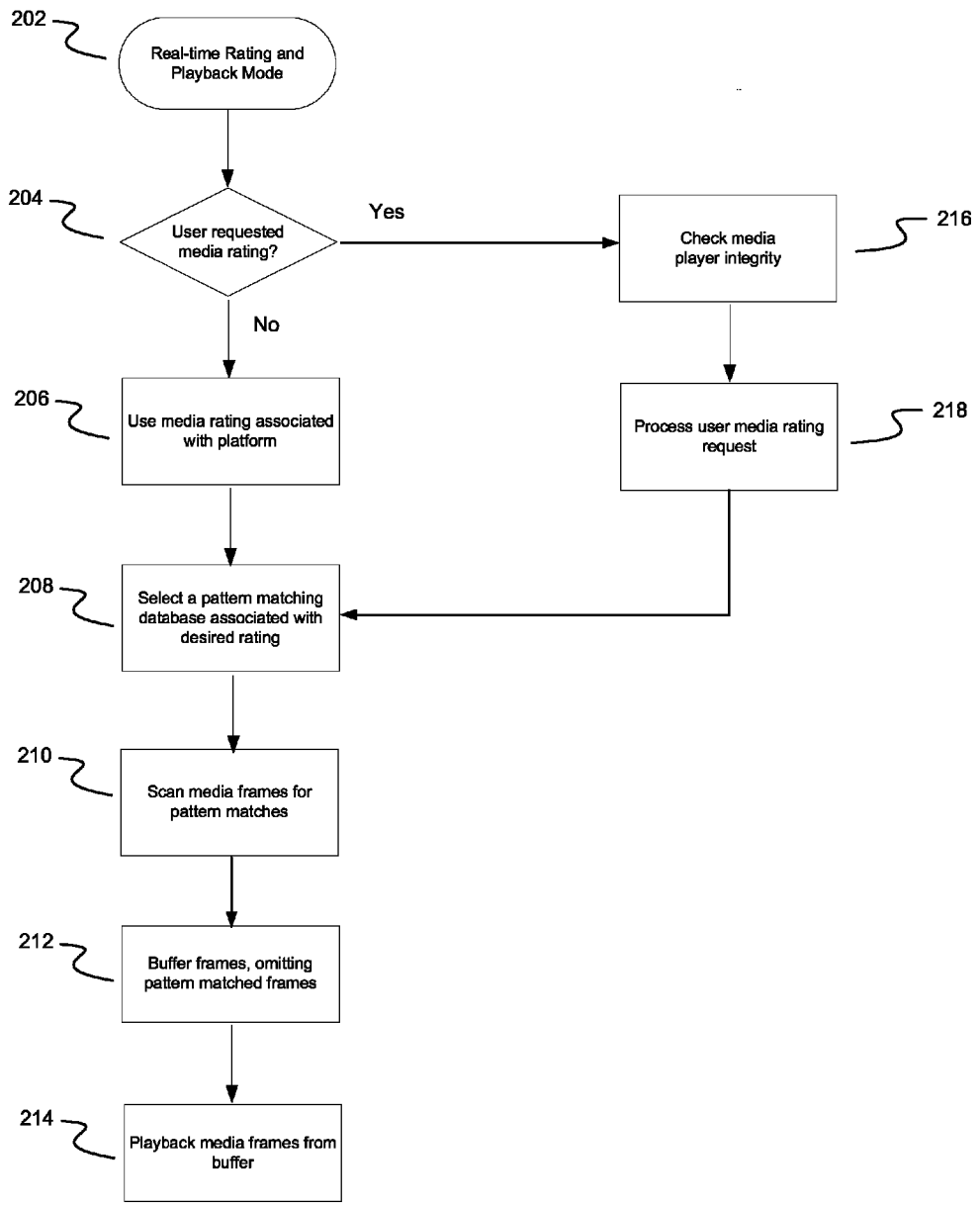
FIG. 2 illustrates a flowchart of operations of another exemplary embodiment consistent with the present disclosure.

FIG. 2 illustrates a flowchart 200 of operations of another exemplary embodiment consistent with the present disclosure. A real-time, or online, rating and playback mode 202 is illustrated. At operation 204, if a user has requested a media rating, then at operation 216 the media player integrity is checked and at operation 218 the user media rating request is processed. The media player integrity may be checked, at operation 216, by verifying a digital signature associated with the media player. Operation 218 may also include a secure, or password based user authentication process.

If there is no user requested media rating, then, at operation 206, a media rating associated with the platform is used. This platform based media rating may be held in secure, non volatile memory on the platform and may only be set or changed through a secure user authentication process.

At operation 208, a pattern matching database associated with the media rating is selected. The media content is then scanned, at operation 210, such that each frame is matched against patterns in the pattern database to determine whether that frame should be included or omitted during playback. The pattern matching may be based on any combination of audio, video, subtitle or other suitable information. When frames are omitted during playback, the audio associated with those frames may also be omitted. At operation 212, frames which are not to be omitted are buffered in preparation for playback. Frame buffering allows for continuous playback, i.e., without interruption noticeable to the viewer, even though frames are omitted. At operation 214, frames are played back from the buffer resulting in media content that conforms to the media rating.

In some embodiments the desired media rating may be changed during playback, i.e., on-the-fly, based on user input. When this occurs, a new pattern matching database associated with the new media rating is selected and substituted for use in determining frame omission going forward in the media playback process.

Figure 3:
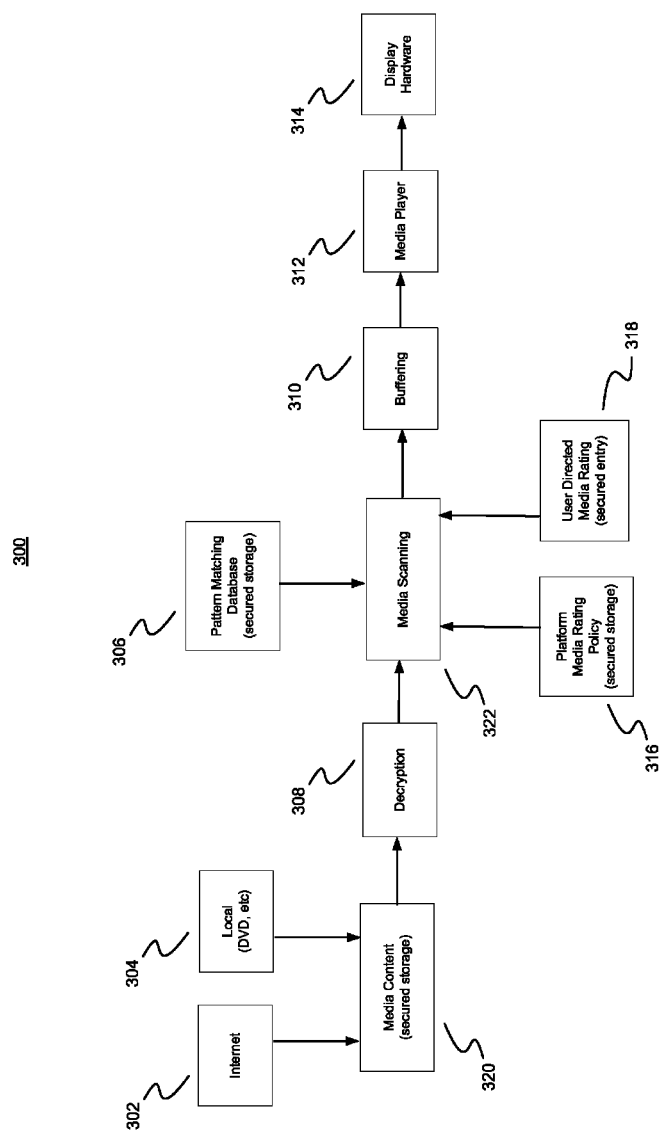
FIG. 3 illustrates a logic block diagram of one exemplary embodiment consistent with the present disclosure.

FIG. 3 illustrates a logic block diagram 300 of one exemplary embodiment consistent with the present disclosure. The embodiment may be hosted, in part, on a media content rating management platform, or simply platform. Media content may be provided to the platform from an internet source 302 or may exist locally 304 (e.g., a DVD, etc). When media content is provided from an internet source 302, a secure internet session may be used and the certifications may be employed for both the provider (server) and the platform (client). The media content may be securely stored in an encrypted form in non-volatile memory 320 such as a hard disk drive, a solid state drive or other suitable memory device coupled to the platform. The encryption may be part of an anti-theft protection scheme employed by the media provider. The encryption may also prevent unauthorized access to the media content prior to processing by the media rating management process. The media content may be decrypted at block 308 of the platform. A pattern matching database exists in secure storage 306 to provide video, audio, subtitle or any other data that may be useful in determining whether a frame of media content complies with a given media rating. Multiple databases may exist in 306 corresponding to different media ratings.

A platform media rating policy 316 may exist in secure storage on the media content rating management platform. A media rating may also be specified by a user 318 employing a secure authentication policy. Media scanning module 322 selects a pattern matching database 306 based on the media rating obtained from the platform media rating policy 316 or the user directed media rating 318. Media scanning module 322 then scans the decrypted media content 308 and compares frames of the media content against the selected pattern matching database 306 to determine whether that frame should be included or omitted during playback. Pattern matching may be based on any combination of audio, video, subtitle or other suitable information.

Media decryption, and any associated decoding, as well as pattern matching may be performed in hardware, for example, a processor core, a graphics processor, special purpose circuitry or other suitable hardware. The processes may also be performed in software or in any combination of hardware and software.

Frames from the media scanning module 322 are buffered by module 310 so that they will be available for playback by media player 312 at the time they are needed, thus avoiding noticeable interruptions during playback. For example, if media scanning module 322 determines that some number of frames corresponding to 5 seconds of media content are to be omitted from playback, then at least 5 seconds of buffering will enable uninterrupted playback. Media player 312 may be a software application, a web browser plug-in, an embedded player in a web browser or other suitable mechanism to provide display hardware 314 with media content to be displayed. By way of non-limiting examples, media player 312 may be a QuickTime Media Player or a Windows Media Player. Display hardware 314 may be a television display, a computer display, a mobile device display or any other suitable display mechanism.

Figure 4:
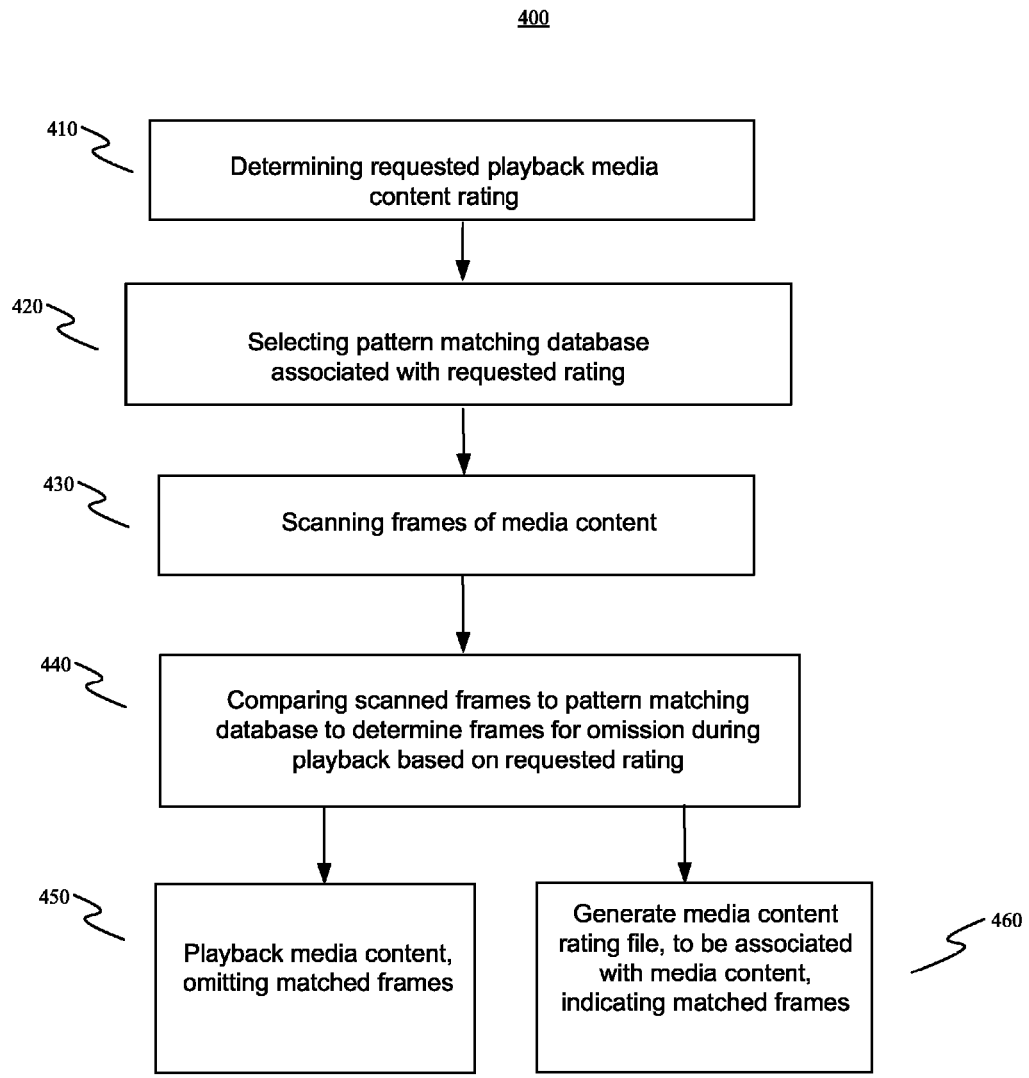
FIG. 4 illustrates a flowchart of operations of another exemplary embodiment consistent with the present disclosure.

FIG. 4 illustrates a flowchart 400 of operations of another exemplary embodiment consistent with the present disclosure. At operation 410, a requested playback media content rating is determined. At operation 420, a pattern matching database associated with the requested rating is selected. At operation 430, frames of the media content are scanned. At operation 440, scanned frames are compared to pattern matching database to determine frames for omission during playback based on the requested rating. At operation 450, the media content is played back omitting the matched frames. At operation 460, a media content rating file is generated, to be associated with the media content. The media content rating file indicates frames that have been matched and are to be omitted during a future playback.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method, comprising:
   determining a requested playback media content rating;
   selecting a pattern matching database associated with said requested playback media content rating;
   scanning one or more frames of media content; and
   comparing said scanned frames of media content to said pattern matching database to determine matched frames for omission from playback based on said requested playback media content rating.

2. The method of claim 1, further comprising omitting said matched frames from a playback of said media content.

3. The method of claim 1, further comprising generating a media content rating file associated with said media content, wherein said media content rating file indicates said matched frames for omission from playback based on said requested playback media content rating.

4. The method of claim 2, wherein said playback of said media content is buffered such that said playback of said media content is continuous while said matched frames are omitted.

5. The method of claim 1, wherein said requested playback media content rating is determined based on a user input to a media player.

6. The method of claim 5, further comprising performing an integrity check on said media player, and wherein said user input is a secure user input.

7. The method of claim 6, wherein said integrity check is a verification of a digital certificate associated with said media player and said secure user input is a verification of a user password.

8. The method of claim 1, wherein said requested playback media content rating is determined based on a configuration of a playback platform, said configuration maintained in a secure storage of said playback platform.

9. The method of claim 1, wherein said comparing is based on at least one of audio content, video content or subtitle information.

10. The method of claim 1, wherein said scanning further comprises decrypting said media content.

11. A method, comprising:
    selecting a playback media content rating;
    providing a media content rating file associated with media content, wherein said media content rating file indicates frames for omission from playback based on a playback media content rating; and
    omitting frames from a playback of said media content based on said media content rating file and said selected playback media content rating.

12. The method of claim 11 further comprising decrypting said media content.

13. A system, comprising:
    a pattern matching database;
    a media rating determination module configured to determine a requested playback media content rating; and
    a processor coupled to said pattern matching database and said media rating determination module, said processor configured to scan one or more frames of received media content, wherein said scanning comprises comparing said frames of received media content to said pattern matching database to determine matched frames for omission from playback based on said requested playback media content rating.

14. The system of claim 13, wherein said processor is further configured to omit said matched frames from a playback of said received media content.

15. The system of claim 14, further comprising buffer circuitry configured to buffer said playback of said received media content such that said playback of said received media content is continuous while said matched frames are omitted.

16. The system of claim 13, further comprising a secure storage module, wherein said secure storage module is configured to maintain said pattern matching database, said received media content and a platform media rating policy, said platform media rating policy provided to said media rating determination module.

17. The system of claim 13, further comprising a decryption module configured to decrypt said received media content prior to said scanning.

18. A non-transitory computer-readable storage medium having instructions stored thereon which when executed by a processor result in the following operations comprising:
    determining a requested playback media content rating;
    selecting a pattern matching database associated with said requested playback media content rating;
    scanning one or more frames of media content; and
    comparing said scanned frames of media content to said pattern matching database to determine matched frames for omission from playback based on said requested playback media content rating.

19. The non-transitory computer-readable storage medium of claim 18, wherein said operations further comprise omitting said matched frames from a playback of said media content.

20. The non-transitory computer-readable storage medium of claim 18, wherein said operations further comprise generating a media content rating file associated with said media content, wherein said media content rating file indicates said matched frames for omission from playback based on said requested playback media content rating.

21. The non-transitory computer-readable storage medium of claim 20, wherein said playback of said media content is buffered such that said playback of said media content is continuous while said matched frames are omitted.

22. The non-transitory computer-readable storage medium of claim 18, wherein said requested playback media content rating is determined based on a user input to a media player.

23. The non-transitory computer-readable storage medium of claim 22, wherein said operations further comprise performing an integrity check on said media player, and wherein said user input is a secure user input.

24. The non-transitory computer-readable storage medium of claim 23, wherein said integrity check is a verification of a digital certificate associated with said media player and said secure user input is a verification of a user password.

25. The non-transitory computer-readable storage medium of claim 18, wherein said requested playback media content rating is determined based on a configuration of a playback platform, said configuration maintained in a secure storage of said playback platform.

26. The non-transitory computer-readable storage medium of claim 18, wherein said comparing is based on at least one of audio content, video content or subtitle information.

27. The non-transitory computer-readable storage medium of claim 18, wherein said scanning further comprises decrypting said media content.

* * * * *